(12) United States Patent
Ichihara

(10) Patent No.: US 7,023,575 B1
(45) Date of Patent: Apr. 4, 2006

(54) IMAGE DATA PRINTING SYSTEM AND IMAGE DATA PRINTING METHOD

(75) Inventor: Shintaro Ichihara, Tokyo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/533,107

(22) Filed: Mar. 22, 2000

(30) Foreign Application Priority Data

Mar. 26, 1999 (JP) ................................. 11-083582
Mar. 8, 2000 (JP) ............................. 2000-063469

(51) Int. Cl.
*G06F 15/00* (2006.01)

(52) U.S. Cl. .................. 358/1.17; 358/1.13; 358/1.14; 358/1.16; 455/566

(58) Field of Classification Search ............... 358/1.17, 358/1.13, 1.14, 1.16, 442, 400, 440, 468, 358/1.1, 1.12; 379/59; 455/566, 466
See application file for complete search history.

(56) References Cited

U.S. PATENT DOCUMENTS 5,473,735 A * 12/1995 Murakami .................. 358/1.17
5,806,005 A * 9/1998 Hull et al. .................. 455/566
6,166,826 A * 12/2000 Yokoyama ................. 358/1.16

FOREIGN PATENT DOCUMENTS

| JP | 7-178974 | 7/1995 |
| JP | 9-114616 | 5/1997 |
| JP | 9-179704 A | 7/1997 |
| JP | 9-307794 | 11/1997 |
| JP | 10-11233 | 1/1998 |
| JP | 11-15615 A | 1/1999 |

* cited by examiner

Primary Examiner—Twyler M. Lamb
(74) Attorney, Agent, or Firm—Sughrue Mion, PLLC

(57) ABSTRACT

An image data printing system includes an image data memory device for storing image data therein, a print device including a first memory section obtaining and storing the image data stored in said image data memory device therein, print data making device for converting the image data stored in said first memory section into print data every time execution of print is instructed, a print section capable of printing an image according to said print data, a second memory section storing the image data stored in said first memory section after the print section has completed printing and communication device including communication sections for transmitting and receiving the image data which are provided respectively for said image data memory device and said print device, and communication passages for connection said communication sections to each other.

9 Claims, 3 Drawing Sheets

IMAGE DATA PRINTING SYSTEM AND IMAGE DATA PRINTING METHOD

BACKGROUND OF INVENTION

1. Field of Invention

The present invention relates to an image data printing system and an image data printing method, and particularly to an image data printing system and an image data printing method in which image data stored in a memory device is transferred through communication means to a printer provided distantly from the memory device for the purpose of printing.

2. Related Art

Conventionally, in case that an image according to image data is printed by a print device such as a printer, image data stored in a memory device such as a hard disc provided for a personal computer (hereinafter called a PC) is converted into print data capable of being recognized by the printer by use of the PC thereby to execute printing. Further, by connecting a digital camera to the printer, image data that has been already photographed and stored in memory medium of the digital camera can be printed by the printer not through the PC but directly.

The image data recorded by the digital camera has been stored in memory medium mounted in the digital camera. However, recently, in order to increase the number of the image data capable of being recorded by the digital camera, a method is proposed in which the recorded image data is transmitted through communication means to a large capacity of a memory device provided for a server computer and stored in the memory device.

In case that not only the image data recorded by the digital camera but also the image data stored in the memory device of the server computer is printed, a user utilizes a PC connected to the server computer through communication means to search a desired image stored in the memory device of the server computer, and while the image data of the desired image received through the communication means is being converted into print data capable of being recognized by the printer, by utilizing the PC, the print operation is performed.

However, since the image data is stored only in the memory device of the server computer, in case that the image is printed, it is necessary to receive the image data from the server computer every time printing is performed.

Further, the image data transmitted from the server computer and received by the printer is a compressed image data. Therefore, it is the image data of several 100 k bites. However, in case that it is converted into the print data for printing in the printer, it becomes large data of about several M bites to several tens M bites, which depends on a size of the image to be printed. Accordingly, there is a problem that when the print data is made up by the server computer and then transferred to the printer, it takes a long time to transfer the data.

SUMMARY OF INVENTION

An object of the invention is to provide an image data printing system which can print image data stored in an image data memory device in a print device not through a processing device such as a PC but directly.

Another object of the invention is to provide an image data printing system which can reduce time necessary to communicate image data to be printed.

According to the first aspect and the third aspect of the invention, in the image data printing system and the image data printing method, the print device comprises the first and second memory sections for storing the image data therein, and the print data making means. Therefore, the image according to the image data in the image data memory device can be output not through the processing device such as the PC but directly from the print device.

Further, in case that the image according to the same image data is repeatedly printed on many sheets, the image data which is a base of the image to be printed is stored in the first memory section, and the print data is made up in the print device. Therefore, it is not necessary to receive the image data from the image data memory device every time printing is performed, so that the time necessary to communicate the image data can be reduced.

Further, the image data which is a base of the image printed in the print device is stored in the second memory section of the print device when the printing is completed. Therefore, the image data which has been printed once is stored in the print device, so that in case that an image according to the same image data is printed, the print device does not need to be reconnected to the image data memory device.

According to the second and fourth aspects of the invention, in the image data printing system and the image data printing method, since the image data memory device is arranged distantly from the print device, the user does not need to own both of the image data memory device and the print device. A large capacity of the image data memory device arranged distantly can be utilized as a server for storing the image data.

According to the fifth aspect of the invention, in the print device, there are provided the first and second memory sections. The image data stored in the first memory section is stored in the second memory section after printing has been executed in the print section. Accordingly, in case that an image according to the same image data is printed, it is not necessary to obtain the image data again, so that the processing of print execution can be simplified.

DETAILED DESCRIPTION OF PREFERRED EMBODIMENTS

A mode for carrying out the invention will be described below in detail in reference with drawings.

Figure 1:
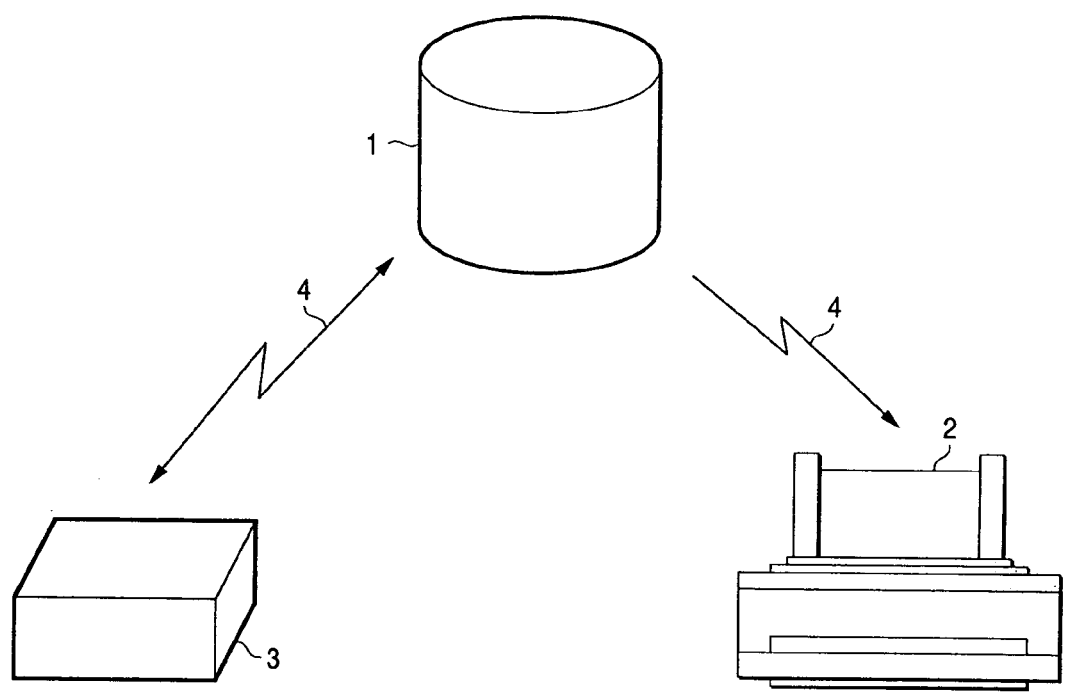
FIG. 1 is a constitutional view showing an image data printing system according to an embodiment of the invention.
Figure 2:
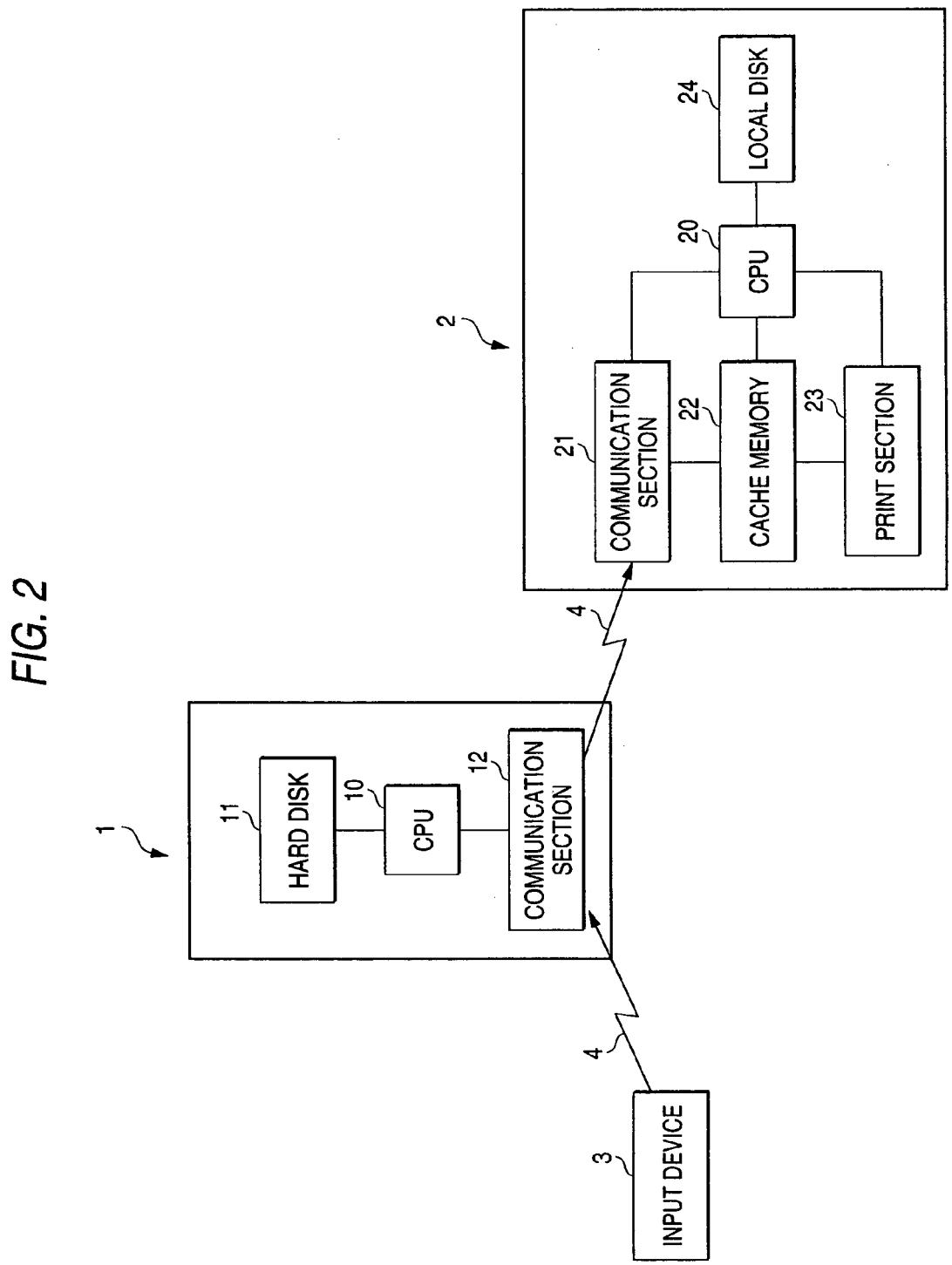
FIG. 2 is a block diagram showing the image data printing system according to the embodiment of the invention.
Figure 3:
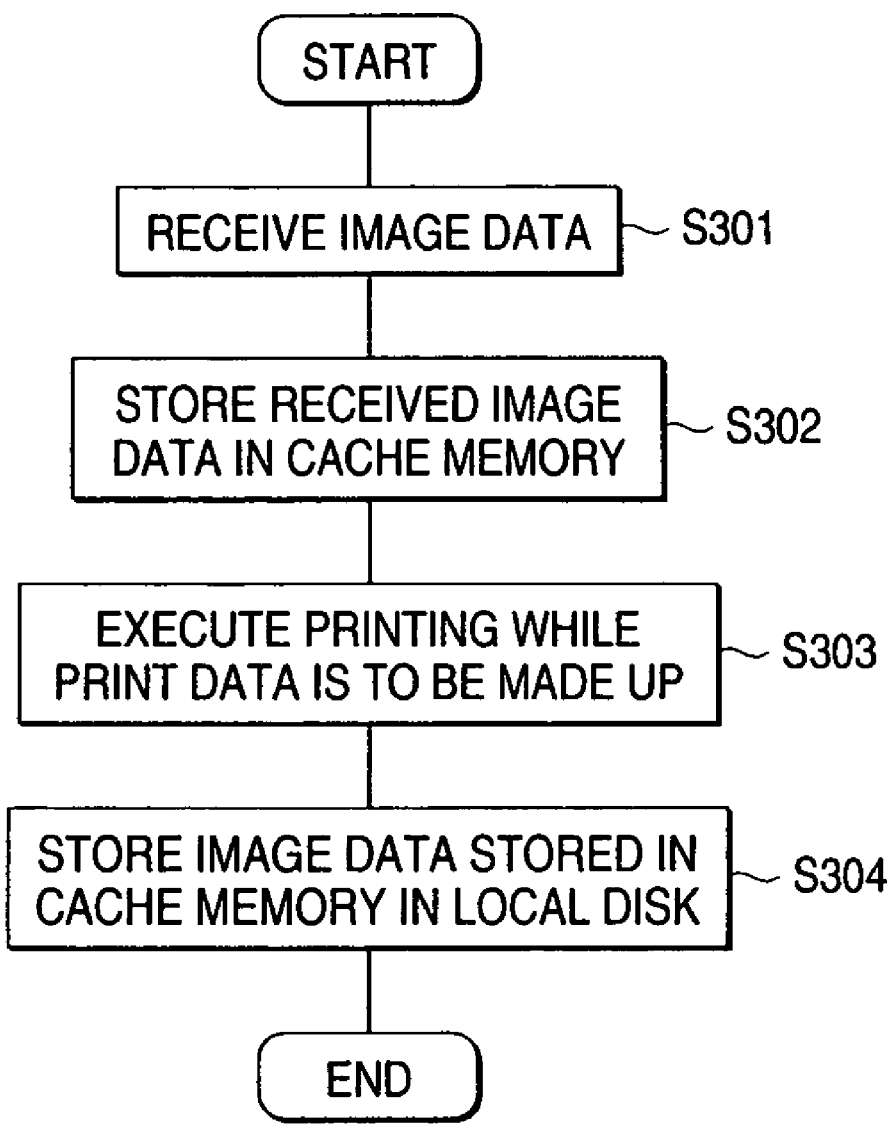
FIG. 3 is a flowchart showing an image data printing method according to the embodiment of the invention.

FIGS. 1 and 2 show image data printing systems according to one embodiment of the invention.

The image data printing system comprises a server computer 1 serving as an image data memory device having a memory device for storing image data input by an input device 3 such as a digital camera, scanner and the like; a printer 2 serving as a print device for printing an image according to the image data stored in the memory device of the server computer 1; and communication means which connects the input device 3 and the printer 2 to the server computer 1 so that the image data can be transmitted and received.

The server computer 1 includes a CPU 10 which is a main body of the computer that can execute image processing and various controls; a hard disc 11 serving as a memory device; and a communication section 12 for connection with a communication passage 4 connected to the input device 3 and the printer 2. As the memory device of the server computer 1, a large capacity of a hard disc which can perform high-speed access is utilized in order to communicate data between the server computer 1 and the printer 2 at a high speed. The server computer 1 is arranged distantly from the printer 2; for example, it is arranged distantly from the user's house by a provider of the server computer or arranged distantly from the printer 2 through a network such as an Internet.

The printer 2 is connected to the server computer 1 not through a processing device such as a personal computer, and can print an image according to the image data stored in the hard disc 11 in accordance with the instruction given directly from the user to the printer 2. In case of the personal user, the printer is arranged in his house.

The printer 2 comprises a communication section 21 for connecting with a communication passage 4 for connecting the printer 2 to the server computer 1; a cache memory 22 serving as a first memory section for temporarily storing the image data received from the server computer 1; a print section 23 for performing a print operation; a local disk 24 serving as a second memory section that can store the image of which printing has been completed; and a CPU 20 serving as converting means for controlling the function of the printer 2 and converting the image data into print data.

The local disc 24 is memory medium capable of storing the image data, which is installed in or out of the printer 2. As long as it is memory medium can read and write data at any time, any memory medium can be utilized, for example, a disc drive device such as a hard disc and a floppy disc, or a flash memory.

The communication means is composed of the communication section 12 provided for the server computer 1, the communication section 21 provided for the printer 2, and the communication passages 4 for connecting the communication sections 12 and 21 to each other. As the communication passage 4, a wire transmission system which utilizes a telephone circuit, SCSI (Small Computer System Interface) system or USB (Universal Serial Bus) system; and a wireless transmission system which utilizes a mobile phone circuit or infrared rays can be utilized. Further, a network such as Internet can be also utilized.

Next, a procedure for printing, by the printer 2, an image according to the image data stored in the hard disc 11 of the server computer 1 will be described.

In a step S301, the printer 2 receives the image data stored in the hard disc of the server computer 1 through the communication means in accordance with instructions given by the user to the input device 3 or the printer 2. In case that the input device 3 is, for example, a digital camera, when the user instructs on execution of printing of a desired image through an instructing section provided for the digital camera, the instruction of the print execution is transmitted to the server computer 1, so that the server computer 1 transmits the image data stored in the hard disc 11 to the printer 2.

In a step S302, the printer 2 stores the received image data in the cache memory 22. The cache memory 22 is a RAM (Random Access Memory). Accordingly, the cache memory 22 can store the received image data quickly, so that time necessary to receive the image data can be reduced.

In a step S303, while print data is being made up in accordance with the image data stored in the cache memory 22, printing is executed. The print data is made up by the CPU 20 of the printer 2, which is necessary to perform the print operation by the printer 2. For example, in case that a color image recorded by the digital camera of which the CCD has the number of picture elements of about a million is printed by use of a color ink jet printer which uses ink of six colors, even if the image data is compressed by a JPEG file to several hundreds kilo-bites, print data which is made up for each color of B (Black), C (Cyan), M (Magenta), Y (Yellow), c (light Cyan), and m (light Magenta) for the purpose of print by the printer 2 and which is adjusted in interpolation and a color tone, becomes large data of several M bites to several tens M bites, which depends on a size of the image to be printed. Here, since the image data has been printed once is stored and kept in the local disc of the printer, it is not necessary to receive the image data from the server computer 1 every time the printing is executed.

Further, in case that an image according to the same image data is repeatedly printed, every time one printing is performed, print data is made up according to the image data stored in the cache memory 22.

Accordingly, the communication time can be reduced more than by making up the print data in the server computer 1 and then transmitting it to the printer 2. Further, since the printing is executed while the print data is being made up, it is not necessary to always store the large print data in the cache memory 22. Therefore, processing and execution of print can be quickly performed.

In a step S304, the image data of which printing has been completed is stored and kept in the local disc 24 provided for the printer 2. Accordingly, the image data which has been once received from the server computer 1 and printed by the printer 2 is stored and kept in the local disc 24 of the printer 2. Therefore, in case that an image that has been printed before is reprinted, that is, in case that an additional print is made, it is not necessary to receive the image data from the server computer 4 again, so that operationality can be improved.

At this time, the image data of which printing has been completed in the print section 23, in order to prevent the image data from being deleted from the local disc 24, is given delete preventing data in a header portion of the image data. Namely, after the delete preventing data is given to the header portion of the image data of which the printing has been completed, its image data is stored and kept in the local disk 24.

As described above, a case in which the digital camera is utilized as an input device has been described. However, the input device is not limited to the digital camera as long as it is an input device capable of inputting image data, such as a scanner and a digital video camera, or an input device capable of inputting text data.

Further, the hard disc is utilized as a memory device of the server computer, however any memory devices can be utilized if they are memory devices each having a large capacity and high-speed access function, such as a magnetic disc, an optical disc and the like.

As described above in the embodiment, according to the image data printing system and the image data printing method of the invention, since the image data that has been printed once is stored and kept in the memory section of the print device, it is not necessary for the print device to receive the image data or the print data from the image data memory device every time printing is executed.

Further, every time printing is executed, the print data is made up from the image data. Therefore, the time necessary for communication can be reduced more than by making up the print data in the image data memory device and then transmitting it.

What is claimed is:

1. An image data printing system comprising:
    an image data memory device for storing image data therein;
    a print device including:
    a first memory section obtaining and storing the image data stored in said image data memory device therein;
    an image data converter for converting the image data stored in said first memory section into print data every time execution of print is instructed;
    a print section capable of printing an image according to said print data;
    a second memory section storing the image data stored in said first memory section after the print section has completed printing; and
    a communication device including communication sections for transmitting and receiving the image data which are provided respectively for said image data memory device and said print device, and communication passages for connecting said communication sections to each other,
    wherein, when the image data is stored in said second memory section, the image data is given delete preventing data.

2. The image data printing system according to claim 1, wherein said image data is unconverted data.

3. A print device comprising:
    a first memory section capable of storing image data stored in an external image data memory device;
    an image data converter for converting the image data stored in said first memory section into print data every time execution of print is instructed;
    a print section capable of printing an image according to said print data; and
    a second memory section storing the image data stored in said first memory section after the print section has completed printing,
    wherein, when the image data is stored in said second memory section, the image data is given delete preventing data.

4. The print device according to claim 3, wherein the image data is unconverted data.

5. An image data printing system comprising:
    an image data memory device for storing image data therein;
    a print device including:
    a first memory section obtaining and storing the image data stored in said image data memory device therein;
    print data making means for converting the image data stored in said first memory section into print data every time execution of print is instructed;
    a print section capable of printing an image according to said print data;
    a second memory section storing the image data stored in said first memory section after the print section has completed printing; and
    a communication device including communication sections for transmitting and receiving the image data which are provided respectively for said image data memory device and said print device, and communication passages for connecting said communication sections to each other,
    wherein the second memory section comprises a disc drive device, and
    wherein, when the image data is stored in said second memory section, the image data is given delete preventing data.

6. An image data printing system comprising:
    an image data memory device for storing image data therein;
    a print device including:
    a first memory section obtaining and storing the image data stored in said image data memory device therein;
    print data making means for converting the image data stored in said first memory section into print data every time execution of print is instructed;
    a print section capable of printing an image according to said print data;
    a second memory section storing the image data stored in said first memory section after the print section has completed printing; and
    a communication device including communication sections for transmitting and receiving the image data which are provided respectively for said image data memory device and said print device, and communication passages for connecting said communication sections to each other,
    wherein the communication passages comprise a wire transmission system, and
    wherein, when the image data is stored in said second memory section, the image data is given delete preventing data.

7. An image data printing system comprising:
    an image data memory device for storing image data therein;
    a print device including:
    a first memory section obtaining and storing the image data stored in said image data memory device therein;
    print data making means for converting the image data stored in said first memory section into print data every time execution of print is instructed;
    a print section capable of printing an image according to said print data;
    a second memory section storing the image data stored in said first memory section after the print section has completed printing; and
    a communication device including communication sections for transmitting and receiving the image data which are provided respectively for said image data memory device and said print device, and communication passages for connecting said communication sections to each other,
    wherein the communication passages comprise a wireless transmission system, and
    wherein, when the image data is stored in said second memory section, the image data is given delete preventing data.

8. An image data printing method for printing image data stored in an image data memory device by a print device, comprising steps of:
    transmitting image data from said image data memory device through communication means to said print device;
    storing the image data received by said print device in a first memory section of said print device;

converting the image data stored in said first memory section into print data that can be printed in a print section of said print device;

performing a print operation by said print section in accordance with said print data;

storing the image data stored in said first memory section in a second memory section of said print device; and providing delete preventing data to the image data when the image data is stored in the second memory section.

9. A print device comprising:

a first memory section capable of storing image data stored in an external image data memory device;

print data making means for converting the image data stored in said first memory section into print data-every time execution of print is instructed;

a print section capable of printing an image according to said print data; and a second memory section storing the image data stored in said first memory section after the print section has completed printing, wherein the second memory section comprises a disc drive device, and wherein, when the image data is stored in said second memory section, the image data is given delete preventing data.

* * * * *